(12) United States Patent
Phatak et al.

(10) Patent No.: US 8,030,254 B2
(45) Date of Patent: Oct. 4, 2011

(54) SYSTEM, METHOD, AND APPARATUS FOR UTILIZING DIVALENT BRINES IN VISCOSIFIED WELL TREATMENT FLUIDS

(75) Inventors: Alhad Phatak, Houston, TX (US); Yenny Christanti, Houston, TX (US); Carlos Abad, Richmond, TX (US); Balkrishna Gadiyar, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 20 days.

(21) Appl. No.: 12/574,248

(22) Filed: Oct. 6, 2009

(65) Prior Publication Data

US 2010/0093565 A1    Apr. 15, 2010

Related U.S. Application Data

(60) Provisional application No. 61/105,629, filed on Oct. 15, 2008.

(51) Int. Cl.
*C09K 8/60* (2006.01)
*C09K 8/68* (2006.01)
*E21B 43/16* (2006.01)

(52) U.S. Cl. ............. 507/277; 166/305.1; 507/203; 507/209; 507/211; 507/219; 507/271

(58) Field of Classification Search .......... 507/277, 507/203, 209, 211, 219, 271, 279; 166/305.1
See application file for complete search history.

(56) References Cited

U.S. PATENT DOCUMENTS

| | | | |
|---|---|---|---|
| 4,477,360 A | | 10/1984 | Almond |
| 4,686,052 A | | 8/1987 | Baranet et al. |
| 5,165,479 A | | 11/1992 | Harris et al. |
| 5,363,916 A | * | 11/1994 | Himes et al. ......... 166/276 |
| 5,981,447 A | * | 11/1999 | Chang et al. ......... 507/271 |
| 6,214,773 B1 | | 4/2001 | Harris et al. |
| 7,165,617 B2 | | 1/2007 | Lord et al. |
| 7,299,876 B2 | | 11/2007 | Lord et al. |
| 2005/0003965 A1 | * | 1/2005 | Xiao et al. ......... 507/100 |
| 2007/0187101 A1 | | 8/2007 | Putzig |
| 2007/0187642 A1 | | 8/2007 | Putzig |

OTHER PUBLICATIONS

Bartko, K. et al., SPE 118904. First Application of High Density Fracturing Fluid to Stimulate a High Pressure and High Temperature Tight Gas Producer Sandstone Formation of Saudi Arabia. 2009 SPE Hydraulic Fracturing Technology Conference held in The Woodlands, Texas USA Jan. 19-21, 2009.
Rivas, L. et al., SPE 116007. Development and Use of High-Density Fracturing Fluid in Deepwater Gulf of Mexico Frac and Packs. 2008 SPE Annual Technical Conference held in Denver, Colorado USA Sep. 21-24, 2008.
Simms III, L. et al, SPE112531. Weighted Frac Fluids for Lower-Surface Treating Pressures. 2008 SPE International Symposium and Exhibition on Formation Damage Control held in Lafayette, Louisiana USA, Feb. 13-15, 2008.
Park, E. et al. SPE 103089. Systematic Approach to the Design and Application of a Weighted Fracturing Fluid to Ensure Deepwater Production. 2006 SPE Annual Technical Conference and Exhibition held in San Antonio, Texas USA Sep. 24-27, 2006.
Bagal, J. et al., SPE 98348. Engineered Application of a Weighted Fracturing Fluid in Deep Water. 2006 SPE International Symposium and Exhibition on Formation Damage Control held in Lafayette, Louisiana USA, Feb. 15-17, 2006.

* cited by examiner

*Primary Examiner* — Timothy J. Kugel
(74) *Attorney, Agent, or Firm* — David G. Matthews; Rodney V. Warfford (57) ABSTRACT

A method includes providing a wellbore treatment fluid having a divalent brine and an amount of polymer and lowering a pH value of the treatment fluid. The method further includes retaining the treatment fluid at the lower pH value until the polymer achieves a primary hydration value. The method further includes adding a cross-linking agent and a cross-linking delay agent to the treatment fluid. The cross-linking agent includes zirconium and/or titanium, and the cross-linking delay agent is a polyol. The method further includes performing a wellbore treatment with the treatment fluid.

37 Claims, 4 Drawing Sheets

SYSTEM, METHOD, AND APPARATUS FOR UTILIZING DIVALENT BRINES IN VISCOSIFIED WELL TREATMENT FLUIDS

RELATED APPLICATIONS

This application is related, and claims the benefit of, U.S. Provisional Patent Application Ser. No. 61/105,629, entitled "Method of treating formation with viscosified divalent brines" filed on Oct. 15, 2008, which is incorporated herein in its entirety by reference.

BACKGROUND

The statements in this section merely provide background information related to the present disclosure and may not constitute prior art.

The technical field generally relates to utilizing divalent brines in viscosified well treatment fluids.

Many wellbore treatment applications are treatment pressure-limited. The treatment pressure is affected, for example, by the pumping rate required to perform a treatment, by the downhole pressure that must be achieved during the treatment, by the distance through the treatment string from the treating equipment to the formation to be treated, by the viscosity of the fluid being pumped, and by the available diameter of the treatment string. Currently available methods to reduce the treating pressure or to treat at higher pressures are either limited or significantly increase costs. Examples of activities to reduce the treating pressure include reducing pump rates which may reduce the economic value of the treatment, increasing the treatment string diameter which requires higher cost tubing and/or a larger wellbore diameter, and reducing the viscosity of the fluid to be pumped which may result in risk of treatment failure or a treatment with reduced economic value. Treating at higher pressures increases the cost of the treatment and increases the risk of equipment failure and therefore unsuccessful treatment. Treating at non-standard pressures (e.g. above 10,000 psi) requires the utilization of special equipment that increases costs and which may not be readily available, and treatments cannot exceed the limit of available equipment which is presently about 15,000 psi in many areas.

Treatment pressures can also be reduced by utilizing a treatment fluid having a higher density. The hydrostatic head of a denser fluid allows a given bottom-hole pressure to be achieved at a lower surface pressure. It is known to utilize a sodium bromide (NaBr) brine, for example, to achieve a fluid having a higher density. However, presently available heavy brines are expensive and not available in all locations. Some divalent brines, for example calcium chloride ($CaCl_2$), are cheap and readily available, and other divalent brines, for example zinc bromide ($ZnBr_2$), allow very high density fluids to be generated. For example, while an NaBr brine can have a density of around 12.5 pounds per gallon (ppg), a $CaBr_2$ brine can have a density of around 14.2 ppg, and a $ZnBr_2$ brine can have a density around 19.2 ppg.

Presently available technologies do not provide for efficient hydration of polymers in divalent brines, limiting the applications of these brines as treatment fluids. Further, borate crosslinkers do not function well in divalent brines at moderate temperatures and high pH, or in general at high temperatures. Zirconium crosslinkers work well in divalent brines and at high temperatures, but unlike borate crosslinkers, zirconium crosslinkers suffer irreversible shear degradation rendering them undesirable, as presently available, for deep wells and/or for high rate applications. Certain embodiments may use viscosifying techniques similar with those disclosed in pending U.S. application Ser. Nos. 12/116,730 and 12/116,759, the disclosures of which are incorporated herein in their entirety. For the reasons described, further technological developments are desirable in this area.

SUMMARY

One embodiment is a unique method to hydrate and cross-link a polysaccharide gel based on a divalent brine. Other embodiments include unique methods, systems, and apparatus to perform wellbore treatments with a treatment fluid including a divalent brine. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The development of any specific embodiment of the present invention includes specific decisions made to achieve the developer's specific goals, such as compliance with system related and business related constraints, which will vary from one implementation to another. Moreover, such a development effort might be complex and time consuming but would nevertheless be a routine undertaking for those of ordinary skill in the art having the benefit of this disclosure. In addition, compositions used or disclosed herein are exemplary only and are not limiting.

Numerical values included in this description should be read once as modified by the term "about" (unless already expressly so modified), and then read again as not so modified unless otherwise indicated in context. Anywhere in this description where concentration ranges are listed or described as being useful, suitable, or the like, it is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified, it is to be understood that inventors appreciate and understand that any and all data points within the range are to be considered to have been specified, and that inventors possessed knowledge of the entire range and all points within the range.

It is understood for all materials and additives described herein that compatibility with: wellbore formations, wellbore in-situ fluids, the base treatment fluid, the cross-linking additives and cross-linking mechanism, and any delay mechanism is to be tested. Where an incompatibility is found, selections from alternatives and similar materials may be utilized wherever such flexibility is available as described herein.

A wellbore treatment fluid includes a divalent brine, an amount of a polymer, a cross-linking agent that is zirconium or titanium, and cross-linking delay agent that may be a polyol. An exemplary embodiment includes carboxy-methyl-hydroxy-propyl guar (CMHPG) which hydrates well in a divalent brine under conditions described herein. The polymer may be other polymers, including, without limitation, hydroxyl-propyl guar, a guar, and/or a polymer that is not a cationic polymer. The wellbore treatment fluid may be used as a base fluid for a hydraulic fracturing treatment, for a gravel pack treatment, and/or for a frac-and-pack treatment combining a fracture and a gravel pack. The wellbore treatment fluid may further be utilized in any application wherein a viscosified fluid is desired, especially but not exclusively in situations where the wellbore is deep, the treated formation is hot, a high density fluid is desirable, and/or a divalent brine is readily available, cheap, or otherwise desirable.

The divalent brine may be $CaCl_2$, $CaBr_2$, and/or $ZnBr_2$, and/or a brine including a salt having a metal such as Ca, Zn, Be, Mg, and/or Sr. The divalent brine may be any concentration known in the art, and can be selected according to the required amount of clay control and/or to achieve a desired brine density. The divalent brine may include more than one type of salt either simultaneously or at various times throughout the treatment, and the density of the treatment fluid may be modulated thereby.

The organo-metallic cross-linking delay agent is provided in an amount to produce sufficient cross-linking delay in the treatment fluid but in an amount low enough to allow cross-linking of the treatment fluid during the treatment. It has been found that the majority of the delay agents used commonly in the art (amines, hydroxyl-alkyl amines, carboxylic acids, hydroxyl-carboxylic acids, amino-carboxylic acids) providing appropriate levels of delay in fresh water, organic clay stabilized brines, or other low density brines such as KCl solutions below 7 weight percent do not provide sufficient delay in divalent heavy brines. It has been found that in the presence of divalent brines the bonding strength of the metal to the ligand is weakened compared to the bonding strength of the metal to the polymer. Thus in heavy divalent brines, the delay agent can be any organic compound providing strong bonding with the organo-metallic crosslinker in fresh water, but that can release the metal in heavy brines at the appropriate temperature. Non limiting examples of such delay agents for use with organo-metallic crosslinkers in divalent heavy brines are multi-dented ligands (e.g. ligands with multiple points of anchoring) having appropriate bonding strength. In certain embodiments poly-hydroxy containing compounds and poly-hydroxy-carboxylic acids are functional ligands for zirconium and titanium crosslinkers. The term polyol as used herein includes any sugar-derived or sugar-like polyol, including oxidized sugars yielding poly-hydroxy-carboxylic acids such as sodium gluconate and reduced sugar derivatives yielding poly-hydroxy containing compounds such as sorbitol xylitol, erythritol or the like. Other cross-linking delay agents may include or be based on fructose, glucose, and/or mannose. The determination of the cross-linking delay agent concentration is a straightforward data analysis step determined according to the pumping time required for the treatment fluid to reach a position where the fluid is expected to achieve viscosity. Alternatively or additionally, the cross-linking delay may be designed for the treatment fluid to cross-link at some point after passing through a high-shear portion of the wellbore or pumping equipment. The cross-linking delay may be further designed to cross-link at a temperature value within the wellbore, such as a temperature where an intermediate viscosifier (e.g. a VES or borate crosslinker) is expected to experience degraded proppant carrying capability.

In certain embodiments, the treatment fluid includes a proppant transport additive (or intermediate viscosifier), and the activity of the proppant transport additive may affect the amount of the cross-linking delay agent. For example, where the proppant transport additive is expected to become less effective at a particular temperature and/or after a particular residence time, wellbore depth due to increasing temperature within the wellbore, the cross-linking delay agent is configured to allow the cross-link to occur around that temperature and/or residence time.

The cross-linking delay effectiveness of various ligands was tested. The polymer used was 1.2 g of CMHPG in 200 mL of a divalent brine (10 ppg $CaCl_2$ brine-1.2 kg/L $CaCl_2$ brine). The polymer was hydrated in the brine by adding 0.02 mL of 37 wt % hydrochloric acid (HCl) to speed up polymer hydration. After hydration, the fluid was brought to pH=9. The hydrated polymer solution was stirred to create a vortex, then 1 mL of tetra-ethylene-pentamine solution (92 wt %) and 5 mL of sodium thiosulfate solution (30 wt %) were added to the solution. Finally, a zirconium complex cross-linker solution was added and the time until vortex closure was recorded. The amount of zirconium complex solution is such that the zirconium concentration was from 7 to 10 parts-per-million (ppm) by total weight of fluid, although other amounts of zirconium are contemplated herein. Table 1 summarizes times for vortex closure for zirconium complexed with various ligands. Results from analogous tests performed in deionized water (instead of $CaCl_2$ brine) are also provided in Table 1 for comparison.

TABLE 1

| Ligand | Ligand:Zr Molar ratio | $H_2O$ vortex closure (min) | $CaCl_2$ vortex closure (min) |
|---|---|---|---|
| Triethanolamine | 15:1 | >120 | <0.2 |
| Lactic acid | 4:1 | 25 | <0.2 |
| Glutamic acid | 2:1 | >120 | <0.2 |
| Sorbitol | 3:1 | >120 | 10 |
| Sodium gluconate | 2:1 | >120 | 15 |

The triethanol-amine ligand included sodium bicarbonate, and all other ligands included tri-ethanol-amine. In the table five different classes of chemicals are represented, hydroxyl-alkyl-amines, hydroxyl-carboxylic acids, amino-carboxylic acids, polyols and poly-hydroxy-carboxylic acids. This example shows that poly-hydroxy compounds such as sorbitol and poly-hydroxy carboxylic acids such as sodium gluconate are much more effective for delaying zirconium crosslinking of CMHPG in $CaCl_2$ brine, when compared to amine and carboxylic acid containing ligands. This example also shows that the commonly used ligands in fluids formulated with fresh water or low density monovalent brines are not effectively working as delay agents in Ca-based brines. Additionally, it also demonstrates that the presence of calcium chloride significantly reduces the zirconium cross-linking delay for all the ligands tested. Table 1 is indicative of the type of data that one of skill in the art collects for a particular embodiment when designing a treatment fluid and a cross-linking delay agent concentration. Inappropriately delayed Zirconium cross-linked fluids do not recover viscosity completely upon application and cessation of high shear, leading to permanent degradation of fluid viscosity. Properly designed delay of the cross-link significantly reduces the extent of shear degradation of the Zirconium cross-linked fluid.

The proppant transport additive is any material that provides sufficient intermediate viscosity and/or proppant carrying capacity at least until the polymer begins to cross-link. Exemplary proppant transport additives include a borate cross-linker, an amount of a visco-elastic surfactant (VES), an amount of fibers, and/or an amount of a non-cross-linking polymer. For example, although the borate cross-linker does not form a strong cross-link in a divalent brine at the reservoir temperature (e.g. due to calcium precipitation at high pH values) the borate cross-linker can be used to develop some intermediate viscosity to assist in proppant carrying through the wellbore and/or in transit to the formation or treatment area. The amount of the proppant transport additive can be configured according to rheology tests and scheduled according to the amount of proppant during various stages of the treatment, and/or according to other criteria understood to one of skill in the art having the benefit of the disclosures herein.

In one example, the treatment fluid includes a proppant carrying additive as a VES. The concentration of the VES may be lower than during a treatment utilizing a VES as a primary viscosifier. In certain embodiments, the VES is included at less than 3% VES by volume, and/or an amount less than ⅓ of a VES primary viscosifier concentration. The VES primary viscosifier concentration is the nominal concentration of VES that would be used in a nominal treatment where cross-linked polymer was not included in the treatment and the VES was used as the primary treatment fluid viscosifier. For example, where a fluid would include 6% VES to achieve a successful treatment as a primary viscosifier (generally based on proppant concentration, density, temperature of the well to be treated, and pumping rate/time in the wellbore), the fluid includes any amount of VES materially lower than 6%, lower than 3%, and/or lower than 2%. The temperature in the wellbore is also generally a consideration for determining VES concentrations, although it will be understood to be a less significant factor where the VES is only enhancing the proppant carrying capacity of the treatment fluid throughout a portion of the wellbore.

One exemplary treatment fluid includes a calcium chloride brine with a CMHPG polymer. The exemplary treatment fluid includes a zirconium or titanium cross-linker, and a polyol cross-linking delay agent such as sodium gluconate or sorbitol. The exemplary treatment fluid further includes an intermediate fluid viscosifier or other proppant carrying additive in an amount that provides proppant carrying capacity at least until the primary zirconium or titanium cross-linker begins to cross-link. In one embodiment, the proppant carrying additive includes a VES at a concentration below 3%.

An exemplary method includes providing a wellbore treatment fluid including a divalent brine and an amount of polymer, lowering a pH value of the treatment fluid, and retaining the treatment fluid at the lower pH value until the polymer achieves at least a primary hydration value. The primary hydration value is a hydration amount achieved at a first hydration step, where later steps are expected to provide sufficient residence time of the treatment fluid such that the amount of polymer acceptably hydrates to achieve the desired rheological properties. For example, if the wellbore treatment process includes an expected six hours between the retaining the treatment fluid at the lower pH and pumping the fluid into the wellbore, if 90% hydration is required for the desired rheological properties, and if it takes six hours to hydrate the fluid from 60% to 90% at the designed treatment pH level, the primary hydration value should be selected to be at least 60% hydration to ensure that the treatment fluid achieves the proper hydration level before the treatment. The primary hydration value may be selected to be higher to provide desired margin depending upon the certainty of the hydration parameters in the pre-treatment period. In certain embodiments, the primary hydration value is selected to be the proper hydration level for the treatment.

In certain embodiments, the treatment fluid is utilized in a high temperature wellbore. For example, the wellbore may have a treatment position temperature greater than 95° C. The treatment position temperature may be a bottomhole temperature. Delayed zirconium cross-linked fluids described herein may be utilized in wellbores having a treatment position temperature greater than 150° C., and/or having a treatment position temperature of at least about 160° C. In certain further embodiments, the treatment fluid is used for a treatment in a wellbore having a treatment position temperature between 95° C. and 180° C. The treatment fluid rheological properties are tested for the expected wellbore conditions, including treatment pressures, downhole temperatures, and fluid shear profile, to ensure that the treatment fluid includes sufficient fluid density, cross-linking delay time, polymer loading, and viscosity at-temperature for the wellbore and treatment conditions of the specific embodiment. In certain embodiments, the temperature range may be extended through techniques understood in the art (e.g. pumping fluid into the formation to be treated for a cool-down, utilizing a higher polymer loading than would be required at a lower temperature), and the described temperature ranges are understood to be exemplary and non-limiting.

Figure 1:
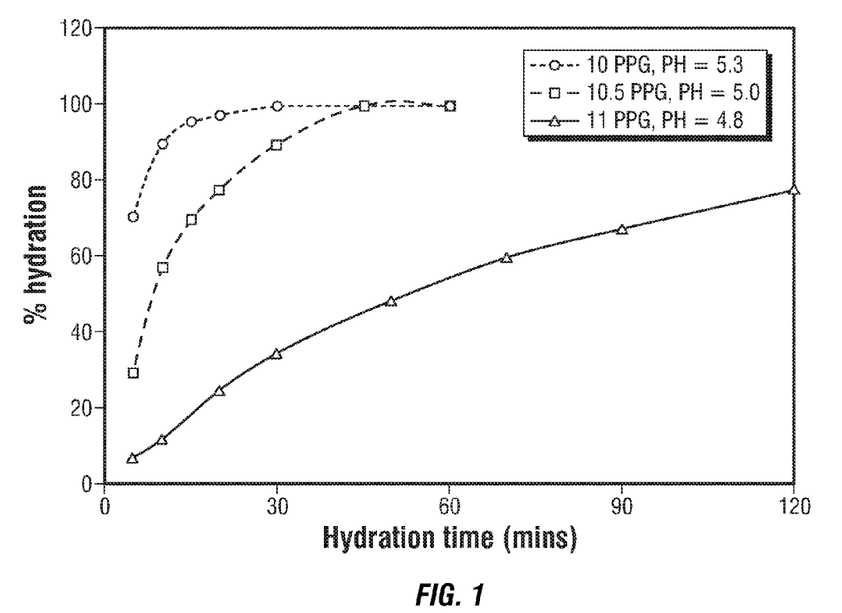
FIG. 1 illustrates polymer hydration times in a $CaCl_2$ brine at various brine concentration values.

Referencing FIG. 1, CMHPG was hydrated in a $CaCl_2$ brine at a variety of pH values. The data in FIG. 1 is representative of actual experimental data. The experiment included 400 mL each of 10 ppg (1.2 kg/L), 10.5 ppg (1.25 kg/L) and 11 ppg (1.3 kg/L) $CaCl_2$ brines in separate Waring blenders with 2.4 grams of CMHPG added and mixed in each blender. HCl was added in to provide the illustrated pH values with an error of ±0.3 pH. Viscosity measurements were performed periodically on a Fann35 viscometer at room temperature, with the samples being stirred in the blender between measurements. The reported % hydration values are based on the final viscosities of the fluid. FIG. 1 illustrates that, at a given pH, the rate of hydration decreases with increasing brine density. Further, FIG. 1 illustrates the type of data that can readily be obtained by one of skill in the art, having the benefit of the disclosures herein, to determine a pH value and time required to hydrate a particular treatment fluid to the primary hydration value and/or the treatment hydration level. Although CMHPG is utilized in the experiment illustrated in FIG. 1, the polymer is not limited to CMHPG.

Figure 2:
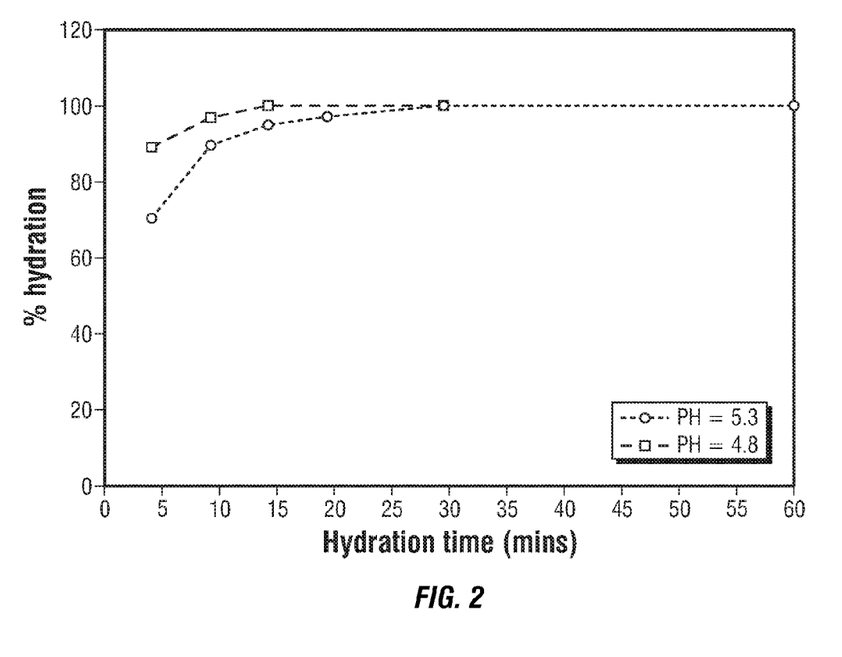
FIG. 2 illustrates polymer hydration times in a $CaCl_2$ brine at various pH values.

Referencing FIG. 2, a first sample of 2.4 g of CMHPG was hydrated in 400 mL of a 10 ppg (1.2 kg/L) $CaCl_2$ brine with added HCl in an amount sufficient to set the pH of the mixture to 5.3. A second sample of 2.4 g of CMHPG was hydrated in a 10 ppg (1.2 kg/L) $CaCl_2$ brine with added HCl in an amount sufficient to set the pH of the mixture to 4.8. The data in FIG. 2 is representative of actual experimental data. Viscosity measurements were performed periodically on a Fann35 viscometer at room temperature, with the samples being stirred in the blender between measurements. FIG. 2 illustrates that a lower pH value can be used to lower the hydration time, and that a hydration time of five minutes to 80% hydration is achievable in a 10 ppg $CaCl_2$ brine.

Figure 3:
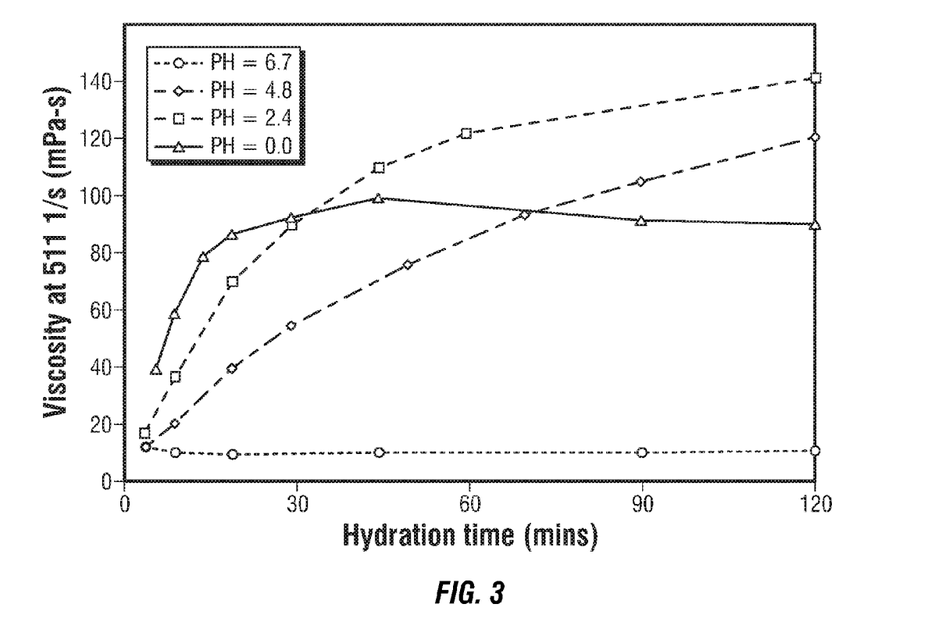
FIG. 3 illustrates polymer hydration times for a heavy $CaCl_2$ brine at various pH values.

Referencing FIG. 3, four samples of 2.4 g of CMHPG were hydrated in 400 mL of an 11 ppg (1.3 kg/L) $CaCl_2$ brine. The data in FIG. 3 is representative of actual experimental data. Viscosity measurements were performed periodically on a Fann35 viscometer at room temperature, with the samples being stirred in the blender between measurements. A first sample had no HCl added, and at the resulting 6.7 pH the first sample did not hydrate. Three other samples had HCl added with resulting pH values of 4.8, 2.4, and 0.0. The sample having a 4.8 pH hydrated to 80% hydration in just over an hour, the sample having a 2.4 pH hydrated to 80% at about 30 minutes, and the sample having a 0.0 pH hydrated to 80% at about 20 minutes. The sample having a 0.0 pH also experienced fluid degradation, with the final and decreasing viscosity that was lower than the 2.4 and 4.8 pH samples.

FIG. 3 illustrates the type of data than can be readily obtained by one of skill in the art, having the benefit of the disclosures herein, to determine a pH value and time required to hydrate a particular treatment fluid to the primary hydration value and/or the treatment hydration level. The type of data as in FIG. 3 can also be utilized to develop a pH trajectory, for example including a very low pH at early hydration times, with adjustments to higher pH values during the hydration to prevent fluid degradation such as observed for the 0.0 pH sample in FIG. 3. The type of data as in FIG. 3 can also be utilized to develop a plan for continuous hydration of a fluid during a treatment. One of skill in the art will understand the required hydration level for a treatment fluid to acceptably perform the designed treatment, and the sizing of any on-site hydration vessels that may be utilized in a continuous hydration process. In the example of FIG. 3, utilizing 11 ppg $CaCl_2$ and CMHPG, hydration of about 60% in ten minutes or 80% in 20 minutes is achievable, which may allow continuous hydration during a treatment in some circumstances but may be prohibitive for continuous hydration during a treatment in other circumstances.

Figure 4:
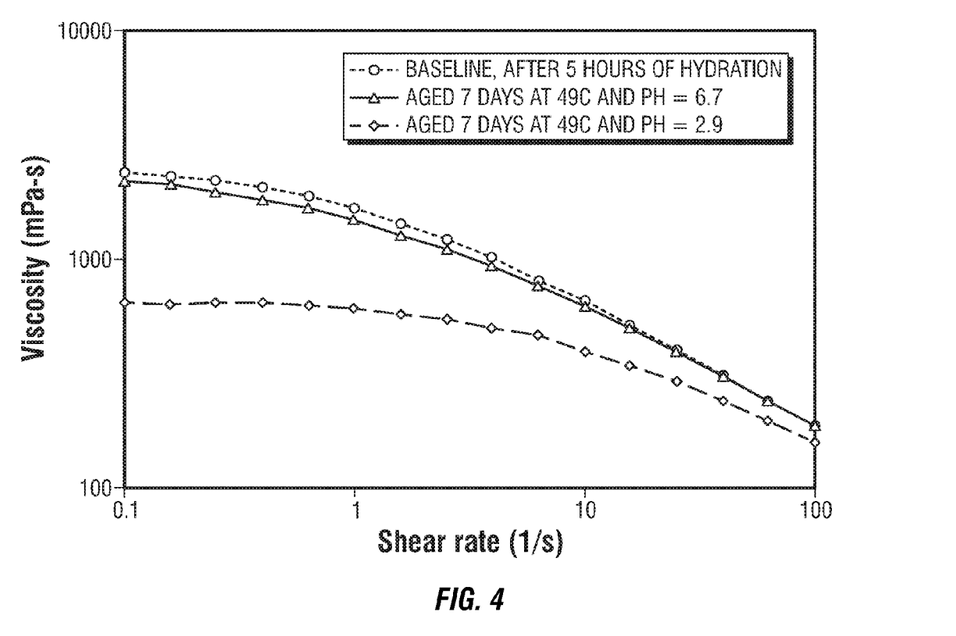
FIG. 4 illustrates polymer aging degradation at various pH values.

Referencing FIG. 4, three samples of 2.4 g of CMHPG were hydrated in 400 ml of an 11 ppg $CaCl_2$ brine, aged at several pH values, and the room temperature (21° C.) viscosities of the samples were measured at several shear rates on a Bohlin Gemini 150 rheometer. The baseline sample was held at a pH of 6.7 for 5 hours and is the standard for FIG. 4 to determine degradation. The next sample was aged for one week at 120° F. at a pH of 6.7, and shows minor degradation of viscosity. The last sample was aged for one week at 120° F. at a pH of 2.9, and shows significant degradation of viscosity. The type of data as in FIG. 4 can be utilized to develop a treatment plan, including where the hydrated or hydrating treatment fluid is to be held and for how long, and further including where the fluid is to be produced, shipped, and utilized at a wellbore treatment.

The examples illustrated in FIGS. 1 to 4 demonstrate that lowering the pH of a divalent brine can allow effective hydration of a polymer that will not otherwise hydrate or that will hydrate prohibitively slowly. The rates of hydration vary and may allow continuous mixing and hydration of the treatment fluid in some circumstances. Where a treatment fluid is batch mixed, the pH may need to be raised after or during hydration to prevent degradation of fluid properties. The optimum pH values, acid concentrations, and hydration times at those pH values for a given brine density can be determined by conventional data such as shown here or by other similar data known to those of skill in the art with the benefit of the disclosures herein. The pH of brines, including $CaCl_2$ brines, can vary significantly from batch to batch, and the optimum pH values, acid concentrations, and hydration times should be evaluated for each treatment except where all conditions are known to be equivalent to an earlier determined treatment.

A first exemplary process for hydrating a polymer in a divalent brine includes operations that may be re-ordered, omitted, and/or other operations may be included. The operations described for the first exemplary process are non-limiting. The first exemplary process includes an operation to source the required amount of a suitable polysaccharide (e.g. guar or guar derivatives such as hydroxyl-propyl guar, carboxy-methyl hydroxyl-propyl guar or cationic guar, etc.), where the fluid may include an acid, a crosslinker, a flow aid agent, a surfactant, suspension agent, and aqueous solvent, and/or a non aqueous solvent. In certain embodiments, the polysaccharide is not a cationic polysaccharide. The process further includes an operation to source the required amount of a suitable divalent heavy brine (e.g. $CaCl_2$, $CaBr_2$, $ZnBr_2$, etc.), or the required amount of a suitable divalent salt and the required amount of a suitable aqueous solvent. The process further includes an operation to source the required amount of a suitable acid (e.g. hydrochloric acid, sulfuric acid, nitric acid, methane sulfonic acid, acetic acid, lactic acid, etc.) and an operation to source the required amount of any other suitable component required to improve hydration, improve fluid shelf life, or the ability of mixing the fluid effectively such as corrosion inhibitors, biocides, de-foamers, etc. The first exemplary process further includes an operation to transport the sourced components to a first "formulating location", where means to provide residence time, temperature and mixing are available. Non-limiting examples of a formulating location include a land location, a yard, a district, and/or a boat location.

A second exemplary process for hydrating a polymer and treating a wellbore includes operations that may be re-ordered, omitted, and/or other operations may be included. The operations described for the second exemplary process are non-limiting. The second exemplary process includes an operation to batch mix the required amounts of the sourced components to formulate a hydrated fluid, at suitable temperature, providing suitable mixing rate, at a suitable pH, so that the required polymer concentration and brine density are obtained, and for the required batch mixing time for the polymer to primarily hydrate in the brine. The second exemplary process further includes an operation to adjust the pH of the hydrated fluid to a suitable pH to further prevent degradation of the fluid properties and to continue to hydrate the hydrated fluid at the newly adjusted pH, and at suitable temperature, providing suitable mixing rate and time. The second exemplary process further includes an operation to continue hydrating and adjusting until a substantially fully hydrated "first fluid" is obtained, an operation to transfer the first fluid to a wellbore or well treating location, and an operation to treat the wellbore with the first fluid. Non-limiting examples of a well treating location include a yard, a well location, a series of mobile trucks, barges, and/or a stimulation boat.

A third exemplary process for hydrating a polymer and treating a wellbore includes operations that may be re-ordered, omitted, and/or other operations may be included. The operations described for the third exemplary process are non-limiting. The third exemplary process includes an operation to batch mix the required amounts of the sourced components to formulate a hydrated fluid, at suitable temperature, providing suitable mixing rate, at a suitable pH, so that the required polymer concentration and a preliminary brine density are obtained, and for the required batch mixing time for the polymer to primarily hydrate in the brine. The preliminary brine density will be lower than or equal to a final treatment fluid brine density. The third exemplary process further includes an operation to adjust the pH of the hydrated fluid to a suitable pH to further prevent degradation of the fluid properties and to continue to hydrate the hydrated fluid at the newly adjusted pH, and at suitable temperature, providing suitable mixing rate and time. The third exemplary process further includes an operation to continue hydrating and adjusting until a substantially fully hydrated "first fluid" is obtained, and an operation to transfer the first fluid to a wellbore or well treating location. In certain embodiments, the third exemplary process includes an operation to admix an amount of salt into the first fluid to bring the brine density up to the final treatment fluid brine density. The operation to admix the amount of salt may be performed before or after the transferring the first fluid to the wellbore. The third exemplary process further includes an operation to treat the wellbore with the first fluid.

A fourth exemplary process for hydrating a polymer and treating a wellbore includes operations that may be re-ordered, omitted, and/or other operations may be included. The operations described for the fourth exemplary process are non-limiting. The fourth exemplary process includes an operation to continuously pump the required amounts of the sourced components to formulate a hydrated fluid, at suitable temperature, providing suitable mixing rate, at a suitable pH, so that the required polymer concentration, and the required brine density are obtained, for the required batch mixing residence time for the polymer stream to primarily hydrate in the brine. The fourth exemplary process further includes, in certain embodiments, operations to adjust the pH of the fluid to prevent degradation of fluid properties, to hydrate the fluid, and to repeat the adjusting the pH and the hydrating until a substantially fully hydrated fluid stream is obtained. The fourth exemplary process further includes an operation to admix an amount of salt into the first fluid to bring the brine density up to the final treatment fluid brine density.

The fourth exemplary process further includes an operation to treat the wellbore with the first fluid. The treating of the wellbore may include adding cross-linkers, surfactants, cross-linking delay agents, breakers, breaker accelerators, breaker retarders, acids, bases, buffers, degradable polymer materials, stabilizers, other water based polymers, biocides, corrosion inhibitors, gaseous compounds, foamers, defoamers, unloading agents, inorganic scale inhibitors, organic scale inhibitors, and/or fines migration additives to the first fluid to provide a formulated fluid. The treating of the wellbore further includes providing a loaded fluid stream by adding a proppant and a proppant carrying additive, including a borate cross-linker, a VES, and/or fibers to the formulated fluid. The treating of the wellbore further includes contacting an earth formation intersected by the wellbore with the formulated fluid stream and/or the loaded fluid stream.

In certain embodiments, the treatment fluid includes a density of at least 11 pounds per gallon (ppg), a density of at least 12.5 ppg, and/or any density values at or above 10 ppg. The density is a value determined according to the desired hydrostatic head of fluid in the wellbore, subject to economic and feasibility constraints. In certain embodiments, the density may be higher, including up to about 11.6 ppg with calcium chloride, up to about 14.2 ppg with calcium bromide, and up to about 19.2 ppg with zinc bromide. The density may be controllable during a treatment, for example by mixing a heavy brine with a lighter brine in a ratio to produce the desired fluid density. The brine mixture may be hydrated with the polymer on the fly, or one or both of the brines in the brine mixture may be hydrated with a polymer in advance and the other brine mixed in with the pre-hydrated fluid.

Certain embodiments of the treatment fluid include triethanolamine and/or tetra-ethylene-pentamine pH buffer. The invention may also include acids (hydrochloric acid, acetic acid, etc.) to speed up polymer hydration in brine. Certain embodiments include the polymer hydrated in relatively low density brine, with the density of the solution subsequently increased by blending with a higher density brine.

In certain embodiments, the method includes lowering the pH to a value below 3, although intermediate values such as below about 5 are useful in certain fluid compositions, and pH values lower than 3 and even as low as 0 (zero) are indicated in certain circumstances. The lowering of the pH value includes adding a strong acid, for example and without limitation hydro-chloric acid. In certain embodiments, the amount of polymer is not a cationic polysaccharide, for example and without limitation the amount of polymer includes carboxy-methyl-hydroxy-propyl guar.

The exemplary method includes hydrating the polymer to at least the primary hydration value within five minutes, and performing a wellbore treatment with the treatment fluid. The method further includes dynamically changing the amount of the polymer during the wellbore treatment. In certain embodiments, the treatment fluid includes a second divalent brine, and the method further includes dynamically changing a concentration of the first divalent and a concentration of the second divalent brine during the wellbore treatment.

The exemplary method further includes adjusting the pH value of the fluid over an increasing pH trajectory with respect to time after the lowering of the pH value of the treatment fluid. For example, the method includes lowering the pH value of the fluid, hydrating the polymer, and raising the pH value of the fluid after the hydration to minimize degradation of fluid properties from long term exposure to the lowered pH. In another example, the method includes lowering the pH value of the fluid, and raising the pH of the fluid over time in one or more steps or ramps to hydrate the polymer rapidly while preventing degradation of the fluid properties. In certain embodiments, the method includes determining the increasing pH trajectory such that a polymer hydration time is maintained below a first threshold and such that a fluid property degradation is maintained below a second threshold. For example, the first threshold may be an available hydration time (e.g. 30 minutes) and the second threshold may be a final hydrated viscosity (e.g. 100 cp) at the hydration time or at a time of treatment.

Yet another exemplary embodiment is a method including providing a wellbore treatment fluid that includes a divalent brine and an amount of polymer, lowering a pH value of the treatment fluid, and retaining the treatment fluid at the lower pH value until the polymer achieves at least a primary hydration value. The method further includes adding a cross-linking agent and a cross-linking delay agent to the treatment fluid, where the cross-linking agent is zirconium or titanium and where the cross-linking delay agent is a polyol. The method further includes performing a wellbore treatment with the treatment fluid. The method further includes increasing the pH value of the treatment fluid before performing the wellbore treatment. The method further includes determining a target cross-linking temperature of the treatment fluid, and adjusting the pH value of the treatment fluid in response to the target cross-linking temperature.

Figure 5:
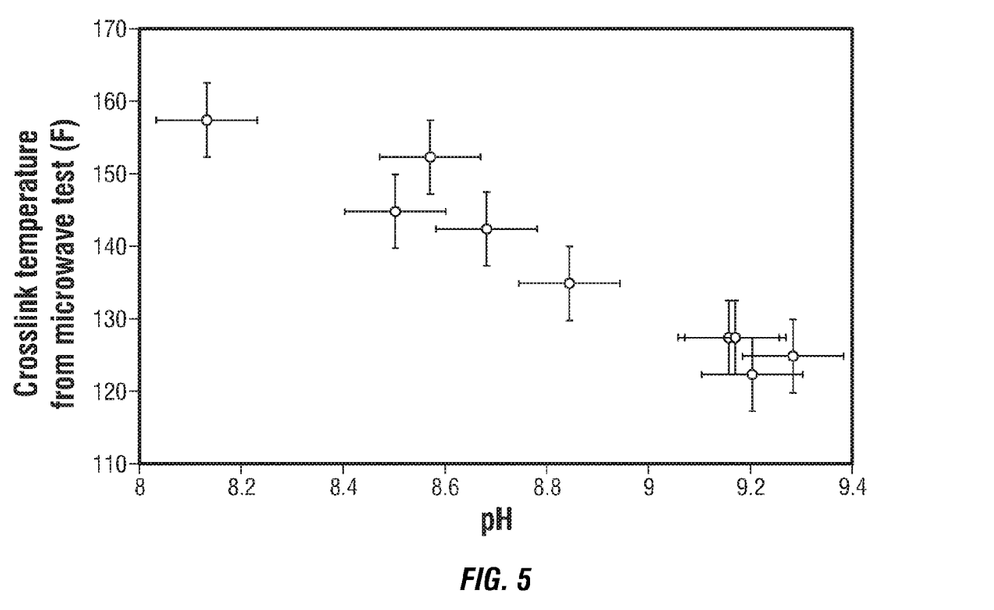
FIG. 5 illustrates a polymer cross-linking temperature at various pH values.

Referencing FIG. 5, fluid pH values versus a cross-link temperature for a fluid are shown. The data shown in FIG. 5 is representative of data from an actual experiment. Carboxy-methyl-hydroxy-propyl guar (CMHPG) in the amount of 1.2 g was hydrated in 200 mL of 10 ppg (1.2 kg/L) $CaCl_2$ brine in the presence of 0.02 mL of 37% hydrochloric acid (HCl). Various amounts of tetra-ethylene-pentamine and 5 ml of a 30% sodium thiosulfate solution were added to the hydrated polymer, followed by a solution of zirconium complexed with triethanol-amine and sodium gluconate (3:1 sodium gluconate:Zr by mole and containing 7 ppm Zr by total fluid mass). The resulting fluids were heated in a microwave oven for 10 seconds at a time, and the temperature at which the fluid exhibited a stable lip was determined to be the crosslink temperature. The pH of the fluids was controlled by the amount of tetra-ethylene-pentamine. Analogous fluids prepared in de-ionized water (instead of the divalent brine) did not crosslink after being heated to temperatures exceeding 170° F.

The data of FIG. 5 indicates a correlation between fluid pH and the crosslink temperature. The crosslink temperature is an indication of how well the zirconium is complexed by the polyol (the cross-linking delay agent, or sodium gluconate in the present example). One of skill in the art can adjust the pH value of the treatment fluid to cross-link the treatment fluid at the target cross-linking temperature of the treatment fluid by determining data similar to that presented in FIG. 5 for a given embodiment. Those of skill in the art will recognize that for divalent brines there is a maximum pH at which the fluid can be formulated without risking substantial hydroxide or oxide precipitation at a given temperature. This substantial-precipitation pH is one consideration when determining a maximum pH at which the fluid should be formulated.

The exemplary method further includes adding an adjustment amount of the divalent brine to the treatment fluid before performing a wellbore treatment, where the adjustment amount is an amount to bring the treatment fluid to a predetermined brine concentration. In certain embodiments, the method includes providing the treatment fluid at a first location and then adding the adjustment amount of the divalent brine at a second location. The method further includes stabilizing the wellbore treatment fluid at the first location.

The method further includes hydrating the polymer to at least the primary hydration value within five minutes, and performing a wellbore treatment with the treatment fluid. The treatment fluid may further include a second divalent brine, and the method further includes dynamically changing a concentration of the divalent brine and a concentration of the second divalent brine during the wellbore treatment, for example such that the treatment fluid has a higher density during a pad treatment stage and a lower density during a proppant treatment stage. The method further includes adding a proppant transport additive to the treatment fluid, where the proppant transport additive includes, without limitation, a borate cross-linker, an amount of a visco-elastic surfactant, an amount of fibers, and/or an amount of a non-cross-linking polymer.

Figure 6:
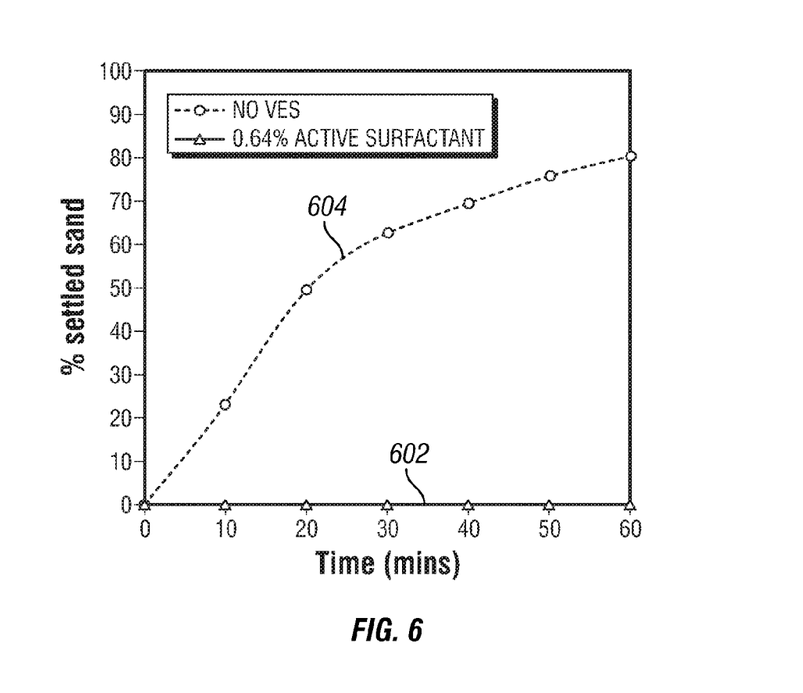
FIG. 6 illustrates a sand carrying capacity of a VES proppant transport additive relative to a fluid with no proppant transport additive.

Referencing FIG. 6, data from a sand settling test is illustrated. The data in FIG. 6 is representative of an actual sand settling experiment at 25° C. FIG. 6 illustrates a first curve 602 showing a percentage of sand settling in a fluid including CMHPG, CaCl2, with a Zr cross-linker and delay agent, plus a proppant transport additive that is a 0.64% VES by volume in the example. The fluid did not cross-link during the room-temperature test illustrated in FIG. 6. The second curve 604 shows a percentage of sand settling in a fluid including CMHPG, $CaCl_2$, with a Zr cross-linker and delay agent without a proppant transport additive. The first curve 602 shows no significant sand settling over 60 minutes, and the second curve shows almost 80% of the sand has settled without the proppant transport additive. As FIG. 6 illustrates, even the inclusion of 0.64% VES at room temperature significantly increases the proppant carrying capacity of the fluid before the cross-linker is activated. At higher temperatures, a greater amount of VES may be required, and in certain embodiments VES concentrations lower than 0.64% may be sufficient. The data as shown in FIG. 6 can be readily determined based on the particular wellbore conditions for a specific embodiment to determine a VES concentration that is effective as a proppant carrying additive.

Figure 7:
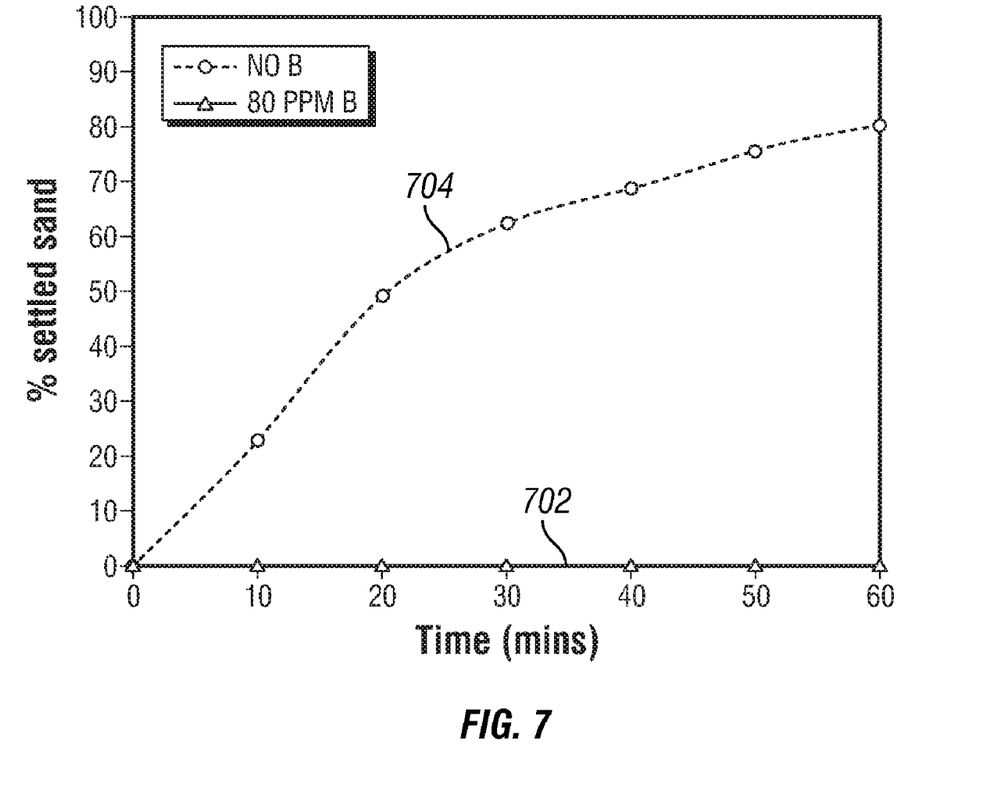
FIG. 7 illustrates a sand carrying capacity of a borate proppant transport additive relative to a fluid with no proppant transport additive.

Referencing FIG. 7, the proppant transport additive of the fluid referenced in regard to FIG. 6 (i.e. 0.64% VES) is replaced with a boron based cross-linker. The first curve 702, including the boron based cross-linker, shows that the boron cross-linker significantly increases the proppant carrying capacity of the fluid before the Zr based cross-link is activated. The second curve 704 again shows almost 80% of the sand has settled without the proppant transport additive.

As is evident from the figures and text presented above, a variety of embodiments according to the present invention are contemplated.

One exemplary embodiment is a wellbore treatment fluid including a divalent brine, an amount of a polymer, a cross-linking agent that is zirconium or titanium, and a cross-linking delay agent, which may be a polyol delay agent. The polymer, in certain embodiments, is carboxy-methyl-hydroxy-propyl guar (CMHPG). The divalent brine may be $CaCl_2$, $CaBr_2$, and/or $ZnBr_2$, and/or the divalent brine may include a salt having a metal such as Ca, Zn, Be, Mg, and/or Sr. The polyol includes any sugar-based polyol, including at least one of sodium gluconate, sorbitol, and/or a base of fructose, glucose, and/or mannose. The polyol is provided in an amount to produce sufficient cross-linking delay in the treatment fluid but in an amount low enough to allow cross-linking of the treatment fluid during the treatment.

The exemplary treatment fluid further includes a proppant transport additive. The proppant transport additive is any material that provides sufficient intermediate viscosity and/or proppant carrying capacity at least until the polymer begins to cross-link. Exemplary proppant transport additives include a borate cross-linker, an amount of a visco-elastic surfactant (VES), an amount of fibers, and/or an amount of a non-cross-linking polymer. In one example, the treatment fluid the VES in an amount less than 3% VES by volume, and/or an amount less than ⅓ of a VES primary viscosifier concentration. The VES primary viscosifier concentration is the nominal concentration of VES that would be used in a nominal treatment where cross-linked polymer was not included in the treatment and the VES was used as the primary treatment fluid viscosifier.

Another exemplary embodiment is a method including providing a wellbore treatment fluid including a divalent brine and an amount of polymer, lowering a pH value of the treatment fluid, and retaining the treatment fluid at the lower pH value until the polymer achieves at least a primary hydration value. The primary hydration value is a hydration amount achieved at a first hydration step, where either later steps are expected to provide sufficient residence time of the treatment fluid such that the amount of polymer will hydrate fully before the treatment, or such that the treatment fluid is acceptably hydrated to achieve the desired rheological properties. For example, the primary hydration value may comprise a 70% hydration threshold, where the fluid at 70% hydration exhibits sufficient viscosity to meet the designed requirements for the treatment, or where the fluid at 70% hydration is expected to dwell in a holding tank long enough to progress to a secondary hydration level where the fluid at the secondary hydration level exhibits sufficient viscosity to meet the designed requirements for the treatment. In a further example, if the fluid is expected to take 6 hours, under the expected holding conditions, to progress from 60% hydration to 90% hydration, where 90% hydration exhibits sufficient viscosity to meet the designed requirements for the treatment, and where the holding conditions are expected to last 6 hours, the primary hydration value is 60%.

The treatment fluid includes a density of at least 11 pounds per gallon (ppg), although in certain embodiments the density may be lower. The density is a value determined according to the desired hydrostatic head of fluid in the wellbore, subject to economic and feasibility constraints. In certain embodiments, the density may be higher, including up to about 11.6 ppg with calcium chloride, up to about 14.2 ppg with calcium bromide, and up to about 19 ppg with zinc bromide. The density may be controllable during a treatment, for example by mixing a heavy brine with a lighter brine in a ratio to produce the desired fluid density. The brine mixture may be hydrated with the polymer on the fly, or one or both of the brines in the brine mixture may be hydrated with a polymer in advance and the other brine mixed in with the pre-hydrated fluid.

In certain embodiments, the method includes lowering the pH to a value below 3, although intermediate values such as below about 5 are useful in certain fluid compositions, and pH values lower than 3 and even as low as 0 (zero) are indicated in certain circumstances. The lowering of the pH value includes adding a strong acid, for example and without limitation hydro-chloric acid. In certain embodiments, the amount of polymer is not a cationic polysaccharide, for example and without limitation the amount of polymer includes carboxy-methyl-hydroxy-propyl guar.

The exemplary method includes hydrating the polymer to at least the primary hydration value within five minutes, and performing a wellbore treatment with the treatment fluid. The method further includes dynamically changing the amount of the polymer during the wellbore treatment. In certain embodiments, the treatment fluid includes a second divalent brine, and the method further includes dynamically changing a concentration of the first divalent and a concentration of the second divalent brine during the wellbore treatment.

The exemplary method further includes adjusting the pH value of the fluid over an increasing pH trajectory with respect to time after the lowering of the pH value of the treatment fluid. For example, the method includes lowering the pH value of the fluid, hydrating the polymer, and raising the pH value of the fluid after the hydration to minimize degradation of fluid properties from long term exposure to the lowered pH. In another example, the method includes lowering the pH value of the fluid, and raising the pH of the fluid over time in one or more steps or ramps to hydrate the polymer rapidly while preventing degradation of the fluid properties. In certain embodiments, the method includes determining the increasing pH trajectory such that a polymer hydration time is maintained below a first threshold and such that a fluid property degradation is maintained below a second threshold. For example, the first threshold may be an available hydration time (e.g. 30 minutes) and the second threshold may be a final hydrated viscosity (e.g. 100 cp) at the hydration time or at a time of treatment.

Yet another exemplary embodiment is a method including providing a wellbore treatment fluid that includes a divalent brine and an amount of polymer, lowering a pH value of the treatment fluid, and retaining the treatment fluid at the lower pH value until the polymer achieves at least a primary hydration value. The method further includes adding a cross-linking agent and a cross-linking delay agent to the treatment fluid, where the cross-linking agent is zirconium or titanium and where the cross-linking delay agent is a polyol. The method further includes performing a wellbore treatment with the treatment fluid. The method further includes increasing the pH value of the treatment fluid before performing the wellbore treatment. The method further includes determining a target cross-linking temperature of the treatment fluid, and adjusting the pH value of the treatment fluid in response to the target cross-linking temperature.

The exemplary method further includes adding an adjustment amount of the divalent brine to the treatment fluid before performing a wellbore treatment, where the adjustment amount is an amount to bring the treatment fluid to a predetermined brine concentration. In certain embodiments, the method includes providing the treatment fluid at a first location and then adding the adjustment amount of the divalent brine at a second location. The method further includes stabilizing the wellbore treatment fluid at the first location.

The method further includes hydrating the polymer to at least the primary hydration value within five minutes, and performing a wellbore treatment with the treatment fluid. The treatment fluid may further include a second divalent brine, and the method further includes dynamically changing a concentration of the divalent brine and a concentration of the second divalent brine during the wellbore treatment, for example such that the treatment fluid has a higher density during a pad treatment stage and a lower density during a proppant treatment stage. The method further includes adding a proppant transport additive to the treatment fluid, where the proppant transport additive includes, without limitation, a borate cross-linker, an amount of a visco-elastic surfactant, an amount of fibers, and/or an amount of a non-cross-linking polymer.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A wellbore treatment fluid, comprising:
   a divalent brine;
   an amount of a polymer;
   a cross-linking agent selected from the group consisting of zirconium and titanium;
   a cross-linking delay agent;
   wherein the cross-linking delay agent comprises a polyol; and
   wherein the polyol comprises at least one compound selected from the group consisting of sodium gluconate and sorbitol.

2. The treatment fluid of claim 1, wherein the polymer comprises carboxy-methyl-hydroxy-propyl guar (CMHPG).

3. The treatment fluid of claim 1, wherein the divalent brine comprises a salt selected from the salts consisting of: $CaCl_2$, $CaBr_2$, and $ZnBr_2$.

4. The treatment fluid of claim 1, wherein the divalent brine comprises a salt having a metal selected from the metals consisting of: Ca, Zn, Be, Mg, and Sr.

5. The treatment fluid of claim 1, further comprising a proppant transport additive.

6. A wellbore treatment fluid, comprising:
a divalent brine;
an amount of a polymer;
a cross-linking agent selected from the group consisting of zirconium and titanium; and
a cross-linking delay agent;
a proppant transport additive; and
wherein the proppant transport additive comprises an amount of a visco-elastic surfactant (VES), the amount of the VES selected from the amount consisting of less than 3% VES by volume and less than ⅓ of a VES primary viscosifier concentration.

7. The treatment fluid of claim 6, wherein the cross-linking delay agent comprises a polyol.

8. The treatment fluid of claim 7, wherein the polyol comprises at least one compound selected from the compounds consisting of a poly-hydroxy compound, a sugar, a sugar derivative, an oxidized sugar, a reduced sugar, and a poly-hydroxy-carboxylic acid.

9. The treatment fluid of claim 7, wherein the polyol comprises a sugar selected from the sugars consisting of fructose, glucose, and mannose.

10. The treatment fluid of claim 6, wherein the proppant transport additive comprises at least one additive selected from the additives consisting of: a borate cross-linker, an amount of a visco-elastic surfactant, an amount of fibers, and an amount of a non-cross-linking polymer.

11. A method, comprising:
providing a wellbore treatment fluid comprising a divalent brine and an amount of polymer;
lowering a pH value of the treatment fluid; and
retaining the treatment fluid at the lower pH value until the polymer achieves at least a primary hydration value; and
wherein the pH value comprises a value below 3.

12. The method of claim 11, wherein the treatment fluid comprises a density of at least 11 pounds per gallon (ppg).

13. The method of claim 11, wherein the treatment fluid comprises a density of at least 12.5 pounds per gallon (ppg).

14. The method of claim 11, wherein the lowering the pH value comprises adding a strong acid.

15. The method of claim 11, wherein the polymer is not a cationic polysaccharide.

16. The method of claim 11, wherein the divalent brine comprises calcium chloride and wherein the amount of polymer comprises carboxy-methyl-hydroxy-propyl guar.

17. A method, comprising:
providing a wellbore treatment fluid comprising a divalent brine and an amount of polymer;
lowering a pH value of the treatment fluid; and
retaining the treatment fluid at the lower pH value until the polymer achieves at least a primary hydration value;
hydrating the polymer to at least the primary hydration value within five minutes, and
performing a wellbore treatment with the treatment fluid.

18. The method of claim 17, further comprising dynamically changing the amount of the polymer during the wellbore treatment.

19. The method of claim 17, wherein the wellbore treatment fluid further comprises a second divalent brine, the method further comprising dynamically changing a concentration of the divalent brine and a concentration of the second divalent brine during the wellbore treatment.

20. A method, comprising:
providing a wellbore treatment fluid comprising a divalent brine and an amount of polymer;
lowering a pH value of the treatment fluid;
retaining the treatment fluid at the lower pH value until the polymer achieves at least a primary hydration value; and
adjusting the pH value of the fluid over an increasing pH trajectory with respect to time after the lowering of the pH value of the treatment fluid.

21. The method of claim 20, further comprising determining the increasing pH trajectory such that a polymer hydration time is maintained below a first threshold and such that a fluid property degradation is maintained below a second threshold.

22. A method, comprising:
providing a wellbore treatment fluid comprising a divalent brine and an amount of polymer, lowering a pH value of the treatment fluid, and retaining the treatment fluid at the lower pH value until the polymer achieves at least a primary hydration value;
adding a cross-linking agent and a cross-linking delay agent to the treatment fluid, the cross-linking agent comprising at least one compound selected from the group consisting of zirconium and titanium; and
performing a wellbore treatment with the treatment fluid.

23. The method of claim 22, further comprising adding an adjustment amount of the divalent brine to the treatment fluid before the performing the wellbore treatment, the adjustment amount comprising an amount to bring the treatment fluid to a pre-determined brine concentration.

24. The method of claim 23, wherein the providing the wellbore treatment fluid is performed at a first location and wherein the adding an adjustment amount is performed at a second location.

25. The method of claim 24, further comprising stabilizing the wellbore treatment fluid at the first location.

26. The method of claim 22, further comprising hydrating the polymer to at least the primary hydration value within five minutes, and performing the wellbore treatment with the treatment fluid.

27. The method of claim 26, wherein the wellbore treatment fluid further comprises a second divalent brine, the method further comprising dynamically changing a concentration of the divalent brine and a concentration of the second divalent brine during the wellbore treatment.

28. The method of claim 27, further comprising dynamically changing a concentration of the divalent brine and the concentration of the second divalent brine such that the treatment fluid has a higher density during a pad treatment stage and a lower density during a proppant treatment stage.

29. The method of claim 22, further comprising increasing the pH value of the treatment fluid before the performing the wellbore treatment.

30. The method of claim 29, further comprising determining a target cross-linking temperature of the treatment fluid, and adjusting the pH value of the treatment fluid in response to the target cross-linking temperature.

31. The method of claim 22, further comprising adding a proppant transport additive to the treatment fluid.

32. The method of claim 31, wherein the proppant transport additive comprises at least one additive selected from the additives consisting of: a borate cross-linker, an amount of a visco-elastic surfactant, an amount of fibers, and an amount of a non-cross-linking polymer.

33. The method of claim 22, wherein the cross-linking delay agent comprises a polyol.

34. The method of claim 22, further comprising performing the wellbore treatment in a wellbore having a treatment position temperature greater than 95° C.

35. The method of claim 22, further comprising performing the wellbore treatment in a wellbore having a treatment position temperature greater than 150° C.

36. The method of claim 22, further comprising performing the wellbore treatment in a wellbore having a treatment position temperature of at least about 160° C.

37. The method of claim 22, further comprising performing the wellbore treatment in a wellbore having a treatment position temperature between 95° C. and 180° C.

* * * * *